United States Patent
Cheng

(10) Patent No.: US 11,966,269 B2
(45) Date of Patent: Apr. 23, 2024

(54) POWER SUPPLY APPARATUS, ELECTRONIC DEVICE, AND METHOD FOR POWER SUPPLY CONTROL

(71) Applicant: BOE Technology Group Co., Ltd., Beijing (CN)

(72) Inventor: Xinyi Cheng, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 23 days.

(21) Appl. No.: 17/425,803

(22) PCT Filed: Jan. 12, 2021

(86) PCT No.: PCT/CN2021/071278
§ 371 (c)(1),
(2) Date: Jul. 26, 2021

(87) PCT Pub. No.: WO2021/147707
PCT Pub. Date: Jul. 29, 2021

(65) Prior Publication Data
US 2023/0367382 A1    Nov. 16, 2023

(30) Foreign Application Priority Data

Jan. 23, 2020  (CN) .......................... 202010076605.4

(51) Int. Cl.
*G06F 1/26* (2006.01)
*G06F 1/30* (2006.01)
(Continued)

(52) U.S. Cl.
CPC .............. *G06F 1/263* (2013.01); *G06F 1/266* (2013.01); *G06F 1/30* (2013.01); *G06F 1/3212* (2013.01);
(Continued)

(58) Field of Classification Search
CPC . G06F 1/263; G06F 1/266; G06F 1/30; G06F 1/324; G06F 11/2015;
(Continued)

(56) References Cited

U.S. PATENT DOCUMENTS 7,359,713 B1   4/2008  Tiwari
8,205,102 B2   6/2012  Kabbara et al.
(Continued)

FOREIGN PATENT DOCUMENTS

CN       101806908 A    8/2010
CN       102710011 A    10/2012
(Continued)

OTHER PUBLICATIONS

CN202010076605.4 first office action.

*Primary Examiner* — Thomas J. Cleary
(74) *Attorney, Agent, or Firm* — IPro, PLLC

(57) ABSTRACT

A power supply apparatus, including: a first power supply component, a power over Ethernet (POE) component, a second power supply component, a first controller, and a power supply path management component. The first power supply component is respectively connected to the first controller and the power supply path management component, the POE component is connected to the first controller, and the first controller and the second power supply component are respectively connected to the power supply path management component. The first controller is configured to: detect whether the first power supply component supplies power; close a power supply path of the POE component when the first power supply component supplies power normally; and control the power supply path management component to open a power supply path of the second power (Continued)

supply component when the POE component supplies power abnormally and the first power supply component does not supply power.

13 Claims, 6 Drawing Sheets

(51) Int. Cl.
    *G06F 1/3212*     (2019.01)
    *G06F 11/20*     (2006.01)
    *H02J 7/00*     (2006.01)
    *H02J 9/06*     (2006.01)

(52) U.S. Cl.
    CPC ........ *G06F 11/2015* (2013.01); *H02J 7/0047* (2013.01); *H02J 9/06* (2013.01)

(58) Field of Classification Search
    CPC ..... G06F 1/3212; H02J 7/0047; H02J 7/0048; H02J 7/34; H02J 9/06; H04L 12/40045; H04L 25/02
    See application file for complete search history.

(56) References Cited

U.S. PATENT DOCUMENTS

| | | | | |
|---|---|---|---|---|
| 2007/0079151 A1* | 4/2007 | Connor | ................... | G06F 1/263 713/300 |
| 2008/0104427 A1* | 5/2008 | Yee | ................... | H04L 12/40045 713/300 |
| 2008/0165796 A1* | 7/2008 | Martinez | ............... | H04L 43/103 370/458 |
| 2008/0168283 A1* | 7/2008 | Penning | .................. | H04L 41/00 713/310 |
| 2008/0238204 A1* | 10/2008 | Yu | ........................... | H04L 12/10 307/66 |
| 2009/0070615 A1 | 3/2009 | Maggiolino et al. | | |
| 2009/0073957 A1* | 3/2009 | Newland | ................. | H04L 12/10 370/352 |
| 2011/0119506 A1* | 5/2011 | Tsai | ........................ | H04L 12/10 713/300 |
| 2011/0125341 A1* | 5/2011 | Heath | ...................... | H04L 12/10 700/295 |
| 2013/0031378 A1* | 1/2013 | Schindler | ............... | H04L 12/413 713/300 |
| 2014/0139664 A1* | 5/2014 | Herzel | .................... | G06F 1/266 307/1 |
| 2015/0180276 A1* | 6/2015 | Kanarellis | ............... | H04L 12/10 307/66 |
| 2016/0064938 A1* | 3/2016 | Balasubramanian | ... | H04L 12/10 307/11 |
| 2016/0273959 A1* | 9/2016 | Wang | ................. | H04B 10/6911 |
| 2016/0308748 A1* | 10/2016 | Zuo | ...................... | H04W 24/04 |
| 2017/0244158 A1* | 8/2017 | Ali | ....................... | H01Q 1/1228 |
| 2018/0013319 A1 | 1/2018 | Kanarellis et al. | | |
| 2018/0367043 A1* | 12/2018 | Dotson | ................. | H04L 12/10 |
| 2019/0129485 A1* | 5/2019 | Amano | ................... | H04L 12/12 |
| 2019/0148937 A1* | 5/2019 | Kawamoto | ............. | H02J 1/102 307/80 |
| 2019/0250683 A1* | 8/2019 | Huang | .................... | H04L 12/10 |
| 2020/0084378 A1* | 3/2020 | Kawamoto | ............ | H04N 23/65 |
| 2021/0006420 A1* | 1/2021 | Neyland | ............. | G06F 11/3058 |
| 2023/0087581 A1* | 3/2023 | Peng | ........................ | H04L 12/10 713/340 |

FOREIGN PATENT DOCUMENTS

| | | |
|---|---|---|
| CN | 203312887 U | 11/2013 |
| CN | 103617711 A | 3/2014 |
| CN | 105337403 A | 2/2016 |
| CN | 105207613 B | 10/2017 |
| CN | 107517106 A | 12/2017 |
| CN | 207603936 U | 7/2018 |
| CN | 110635555 A | 12/2019 |
| CN | 111245088 A | 6/2020 |
| EP | 2222063 A1 | 8/2010 |

\* cited by examiner

POWER SUPPLY APPARATUS, ELECTRONIC DEVICE, AND METHOD FOR POWER SUPPLY CONTROL

CROSSREFERENCE TO RELATED APPLICATION

The present disclosure claims priority to Chinese Patent Application No. 202010076605.4, titled "POWER SUPPLY APPARATUS, ELECTRONIC DEVICE, AND METHOD FOR POWER SUPPLY CONTROL" and filed to the State Patent Intellectual Property Office on Jan. 23, 2020, the entire contents of which are incorporated herein by reference.

TECHNICAL FIELD

The present disclosure relates to the field of power supply technologies, and more particularly, to a power supply apparatus, an electronic device, and a method for power supply control.

BACKGROUND

Power Over Ethernet (POE) is a method for supplying power to connected network terminating equipment over Ethernet based on the existing Ethernet architectures. With reference to FIG. 1, a POE power supply system includes power sourcing equipment (PSE) 100 and a powered device (PD) 101. One PSE may be connected to a plurality of PDs, and may provide power to the PDs through network cables.

However, at present research on the POE is mainly focused on implementation of the POE system, power distribution, or the like. No consideration is given to the problem of POE backup power supply. However, once accidental power outage caused by malfunctions of the PSE or the network cables, adverse effects are inevitably exerted on the PDs, and thus losses are caused.

SUMMARY

Embodiments of the present disclosure provide a power supply apparatus, an electronic device, and a method for power supply control.

To achieve the above objective, the embodiments of the present disclosure adopt following technical solutions.

In one aspect, there is provided a power supply apparatus, which includes: a first power supply component, a power over Ethernet (POE) component, a second power supply component, a first controller, and a power supply path management component. The first power supply component is respectively connected to the first controller and the power supply path management component. The POE component is connected to the first controller, and the first controller and the second power supply component are respectively connected to the power supply path management component.

The first controller is configured to: detect whether the first power supply component supplies power;
close a power supply path of the POE component when the first power supply component supplies power normally; and
control the power supply path management component to open a power supply path of the second power supply component when the POE component supplies power abnormally and the first power supply component does not supply power.

Alternatively, the first controller is also configured to:
open the power supply path of the POE component when the first power supply component does not supply power;
detect whether the POE component supplies power normally; and
control the power supply path management component to keep a closed state of the power supply path of the second power supply component when the POE component supplies power abnormally and the first power supply component supplies power.

Alternatively, the first power supply component is an adapter power supply component, and the second power supply component is a battery power supply component.

Alternatively, the second power supply component includes a rechargeable battery. The power supply apparatus also includes a second controller, a power query component, and a charging component. The first controller and the second power supply component are respectively connected to the second controller through the power supply path management component. The power query component is respectively connected to the second controller and the second power supply component, and the charging component is respectively connected to the second controller and the second power supply component.

The power query component is configured to detect power of the rechargeable battery, and send power information of the rechargeable battery to the second controller.

The second controller is configured to:
receive the power information of the rechargeable battery, and determine a magnitude relationship between the power of the rechargeable battery and a preset first threshold according to the power information of the rechargeable battery; and open a charging path of the charging component when the power of the rechargeable battery is less than the first threshold.

Alternatively, the second controller is further configured to:
receive the power information of the rechargeable battery, and determine the magnitude relationship between the power of the rechargeable battery and a preset second threshold according to the power information of the rechargeable battery; and close the charging path of the charging component when the power of the rechargeable battery is greater than or equal to the second threshold, wherein the second threshold is greater than the first threshold.

The embodiments of the present disclosure provide a power supply apparatus, which includes: a first power supply component, a power over Ethernet (POE) component, a second power supply component, a first controller, and a power supply path management component. The first power supply component is respectively connected to the first controller and the power supply path management component, the POE component is connected to the first controller, and the first controller and the second power supply component are respectively connected to the power supply path management component. The first controller is configured to: detect whether the first power supply component supplies power; close a power supply path of the POE component when the first power supply component supplies power normally; and control the power supply path management component to open a power supply path of the second power supply component when the POE component supplies power abnormally and the first power supply component does not supply power.

In this way, when the POE component cannot supply power, the power supply apparatus may also supply power by means of the first power supply component or the second power supply component. That is, in addition to the POE component, two power supply components are backed up, such that the power supply apparatus can continue supplying power when power supply of the POE component is accidentally interrupted, thereby avoiding losses caused by accidental power outage.

In another aspect, there is provided an electronic device, which includes the power supply apparatus according to any one of the above embodiments.

Alternatively, the electronic device also includes a wireless communication component. The wireless communication component is connected to the second controller of the power supply apparatus, and is configured to communicate with a server in a communication network under the control of the second controller.

The first power supply component of the power supply apparatus is an adapter power supply component, the second power supply component of the power supply apparatus is a battery power supply component, and the second power supply component includes a rechargeable battery.

The power query component of the power supply apparatus is configured to detect power of the rechargeable battery after the power supply path of the second power supply component is opened, and send power information of the rechargeable battery to the second controller.

The second controller is configured to receive the power information of the rechargeable battery, and adjust a heartbeat frequency of the wireless communication component according to the power information of the rechargeable battery.

Alternatively, the second controller being configured to receive the power information of the rechargeable battery, and adjust a heartbeat frequency of the wireless communication component according to the power information of the rechargeable battery includes:
  the second controller being configured to:
    determine a magnitude relationship between the power of the rechargeable battery and a first predetermined value;
    reduce the heartbeat frequency of the wireless communication component to a first frequency when the power of the rechargeable battery is less than the first predetermined value;
    reduce the heartbeat frequency of the wireless communication component to a second frequency and reduce a system clock frequency when the power of the rechargeable battery is less than a second predetermined value; and
    disable a heartbeat function of the wireless communication component, report low power prompt information to the server, and enable a low power mode when the power of the rechargeable battery is less than a third predetermined value.

The first predetermined value is greater than the second predetermined value, the second predetermined value is greater than the third predetermined value, and the first frequency is greater than the second frequency.

Alternatively, the wireless communication component is configured to receive a downlink refresh command and record a plurality of time stamps.

The second controller is further configured to:
  analyze system working time according to the plurality of time stamps; and
  establish a working model according to an analysis result to adjust a frequency of interaction between the wireless communication component and the server.

Alternatively, the second controller being further configured to: analyze system working time according to the plurality of time stamps; and establish a working model according to an analysis result to adjust a frequency of interaction between the wireless communication component and the server includes:
  the second controller being further configured to:
    divide the system working time into a first working time period and a second working time period according to the plurality of time stamps.

The frequency of interaction between the wireless communication component and the server in the first working time period is greater than that in the second working time period.

Alternatively, the electronic device also includes a display screen. The display screen is connected to the second controller, and is configured to display information received by the wireless communication component.

The embodiments of the present disclosure provide an electronic device. The electronic device has three power supply components, namely, a POE component, a first power supply component, and a second power supply component. When the POE component cannot supply power, the electronic device can still supply power by means of the first power supply component or the second power supply component to ensure normal operation. The electronic device has high reliability and high safety.

In still another aspect, there is provided a method for power supply control, which is applied to the above-mentioned electronic device. The method includes:
  detecting whether a first power supply component supplies power;
  opening the power supply path of the POE component when the first power supply component does not supply power;
  detecting whether the POE component supplies power normally;
  closing the power supply path of the POE component when detecting that the POE component supplies power abnormally;
  detecting whether the first power supply component supplies power when the POE component supplies power abnormally; and
  opening a power supply path of a second power supply component when the POE component supplies power abnormally and the first power supply component does not supply power.

Alternatively, a power supply apparatus of an electronic device includes a charging component, the first power supply component is an adapter power supply component, the second power supply component is a battery power supply component, and the second power supply component includes a rechargeable battery.

The method also includes:
  detecting power of the rechargeable battery;
  determining a magnitude relationship between the power of the rechargeable battery and a preset first threshold; and
  opening a charging path of the charging component when the power of the rechargeable battery is less than the first threshold.

Alternatively, the method further includes:
    detecting the power of the rechargeable battery when the charging component charges the rechargeable battery; and
    closing the charging path of the charging component when the power of the rechargeable battery is greater than or equal to a second threshold.

The second threshold is greater than the first threshold.

Alternatively, the electronic device also includes a wireless communication component. The wireless communication component is connected to the second controller of the power supply apparatus, and is configured to communicate with a server in a communication network under the control of the second controller.

After opening the power supply path of the second power supply component, the method for power supply control also includes:
    detecting power of the rechargeable battery of the second power supply component;
    reducing a heartbeat frequency of the wireless communication component to a first frequency when the power of the rechargeable battery is less than a first predetermined value;
    reducing the heartbeat frequency of the wireless communication component to a second frequency and reducing a system clock frequency when the power of the rechargeable battery is less than a second predetermined value; and
    disabling a heartbeat function of the wireless communication component when the power of the rechargeable battery is less than a third predetermined value.

The first predetermined value is greater than the second predetermined value, the second predetermined value is greater than the third predetermined value, and the first frequency is greater than the second frequency.

Alternatively, the electronic device also includes a wireless communication component. The wireless communication component is connected to a second controller of the power supply apparatus, and is configured to receive a downlink refresh command under the control of the second controller, and to record a plurality of time stamps.

The second controller is configured to divide system working time into a first working time period and a second working time period according to the plurality of time stamps.

After opening the power supply path of the second power supply component, the method for power supply control also includes:
    enabling a first power mode in the first working time period; and
    enabling a second power mode in the second working time period, wherein power consumption in the second power mode is less than that in the first power mode.

The above description is merely an overview of the technical solutions of the present disclosure. In order to more apparently understand the technical means of the present disclosure to implement in accordance with the contents of specification, and to more readily understand above and other objectives, features and advantages of the present disclosure, specific embodiments of the present disclosure are provided hereinafter.

BRIEF DESCRIPTION OF THE DRAWINGS

To describe the technical solutions of the embodiments of the present disclosure or that of the prior art more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Technical solutions in the embodiments of the present disclosure will be described clearly and completely below, in conjunction with the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

To clearly describe the technical solutions in the embodiments of the present disclosure, in the embodiments of the present disclosure, the words "first", "second", "third", and so on are employed to distinguish between the same or similar items whose functions and roles are basically the same. Those skilled in the art may understand that the words "first", "second", "third", and so on do not impose restrictions on the number or execution order.

Figure 1:
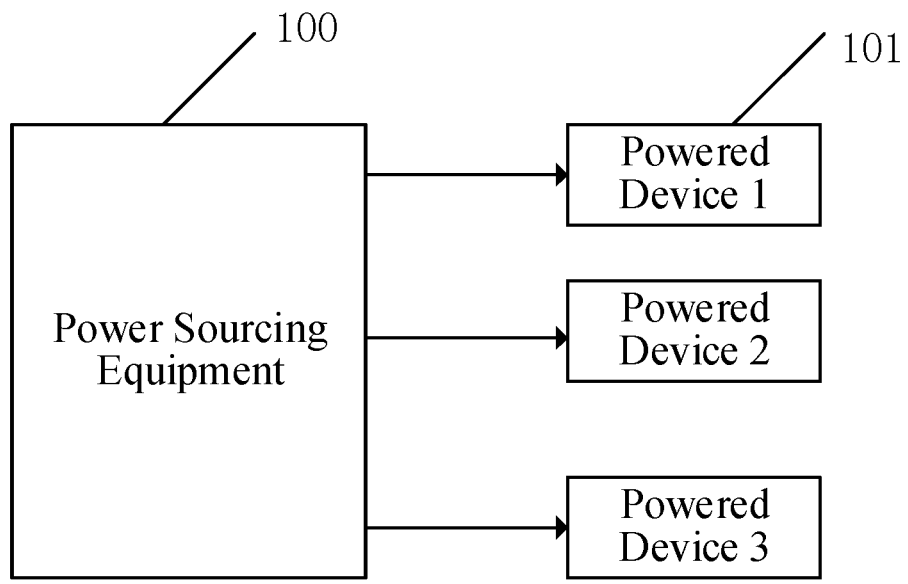
FIG. 1 is a schematic structural diagram of a POE (Power Over Ethernet) power supply system in the existing technologies.
Figure 2:
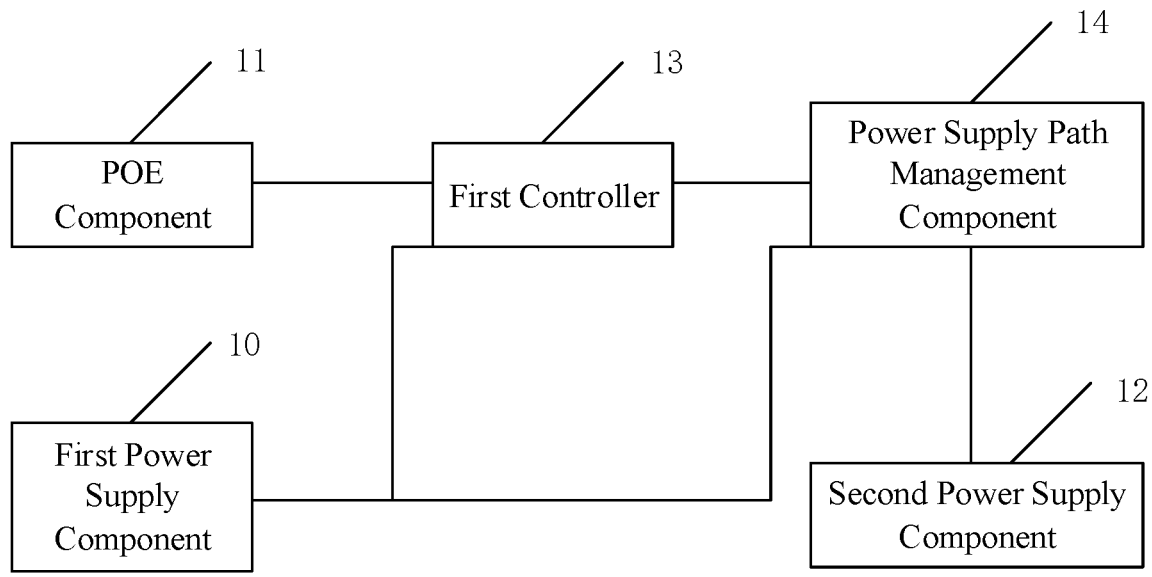
FIG. 2 is a schematic structural diagram of a power supply apparatus according to an embodiment of the present disclosure.

The embodiments of the present disclosure provide a power supply apparatus. With reference to FIG. 2, the power supply apparatus includes: a first power supply component 10, a power over Ethernet (POE) component 11, a second power supply component 12, a first controller 13, and a power supply path management component 14. The first power supply component 10 is respectively connected to the first controller 13 and the power supply path management component 14. The POE component 11 is connected to the first controller 13, and the first controller 13 and the second power supply component 12 are respectively connected to the power supply path management component 14.

The first power supply component and the second power supply component may be the same power supply component or different power supply components, which may be specifically determined according to actual requirements. To improve selectivity, the first power supply component and the second power supply component may be selected as different power supply components.

In addition, specific structures included in the first power supply component and the second power supply component are not limited here. Taking the first power supply component as an example, the first power supply component may be an adapter power supply component, and the adapter power supply component may include an adapter and a power cord. In this case, power supply can be implemented by plugging the adapter into a socket. Furthermore, the first power supply component may also be a battery power supply component. The adapter power supply component may include a battery, which may be a rechargeable battery such as a lithium battery, or may be a non-rechargeable battery. Of course, the first power supply component may also be a power supply component in other ways. For example, the first power supply component may include a mobile power supply, or an uninterrupted power supply (UPS), etc. In this case, power can be supplied through the mobile power supply or the UPS without the socket. Reference may be made to the first power supply component for the specific structure included in the second power supply component, which is not to be described here. In consideration of cost performance and space saving, the first power supply component may be an adapter power supply component, and the second power supply component may be a battery power supply component.

The above-mentioned POE component may include a network interface, such as an RJ45 interface. Generally, a power source obtained from the network interface cannot be directly used and needs to be processed accordingly. Therefore, the POE component may also include a transformer and a rectifier circuit, wherein the network interface is connected to the transformer, and the transformer is connected to the rectifier circuit.

The first controller may be a POE controller, which may utilize chips such as TPS2378 and TPS23757 chips. The specific structure of the power supply path management component is not limited here either. The power supply path management component is configured to open or close a power supply path of a power supply component connected to the power supply path management component, to implement power supply switching between different power supply components. For example, in some embodiments of the present disclosure, the power supply path management component can open the power supply path of the second power supply component or keep a closed state of the power supply path of the second power supply component. The power supply path management component may be a component such as an electric switch executed in response to a control signal.

The first controller is configured to:
  detect whether the first power supply component supplies power;
  close the power supply path of the POE component when the first power supply component supplies power normally; and
  control the power supply path management component to open the power supply path of the second power supply component when the POE component supplies power abnormally and the first power supply component does not supply power.

The embodiments of the present disclosure provide a power supply apparatus. When the POE component cannot supply power, the power supply apparatus may also supply power by means of the first power supply component or the second power supply component. That is, in addition to the POE component, two power supply components are backed up, such that the power supply apparatus can continue supplying power when power supply of the POE component is accidentally interrupted, thereby avoiding losses caused by accidental power outage.

After the POE component is employed, to detect in time whether the POE component supplies power abnormally, and to facilitate a user to troubleshoot in time, alternatively, the first controller is also configured to:
  open the power supply path of the POE component when the first power supply component does not supply power;
  detect whether the POE component supplies power normally; and
  control the power supply path management component to keep a closed state of the power supply path of the second power supply component when the POE component supplies power abnormally and the first power supply component supplies power.

It is to be noted that the first controller also may be configured to:
  keep an open state of the power supply path of the POE component when the POE component supplies power normally; and
  close the power supply path of the POE component when the POE component supplies power normally.

In consideration of cost performance and space saving, alternatively, the first power supply component is an adapter power supply component, and the second power supply component is a battery power supply component. The second power supply component may include a battery, which may be a rechargeable battery such as a lithium battery, or may be a non-rechargeable battery. In consideration of durability and cost reduction, preferably the rechargeable battery is selected.

Figure 3:
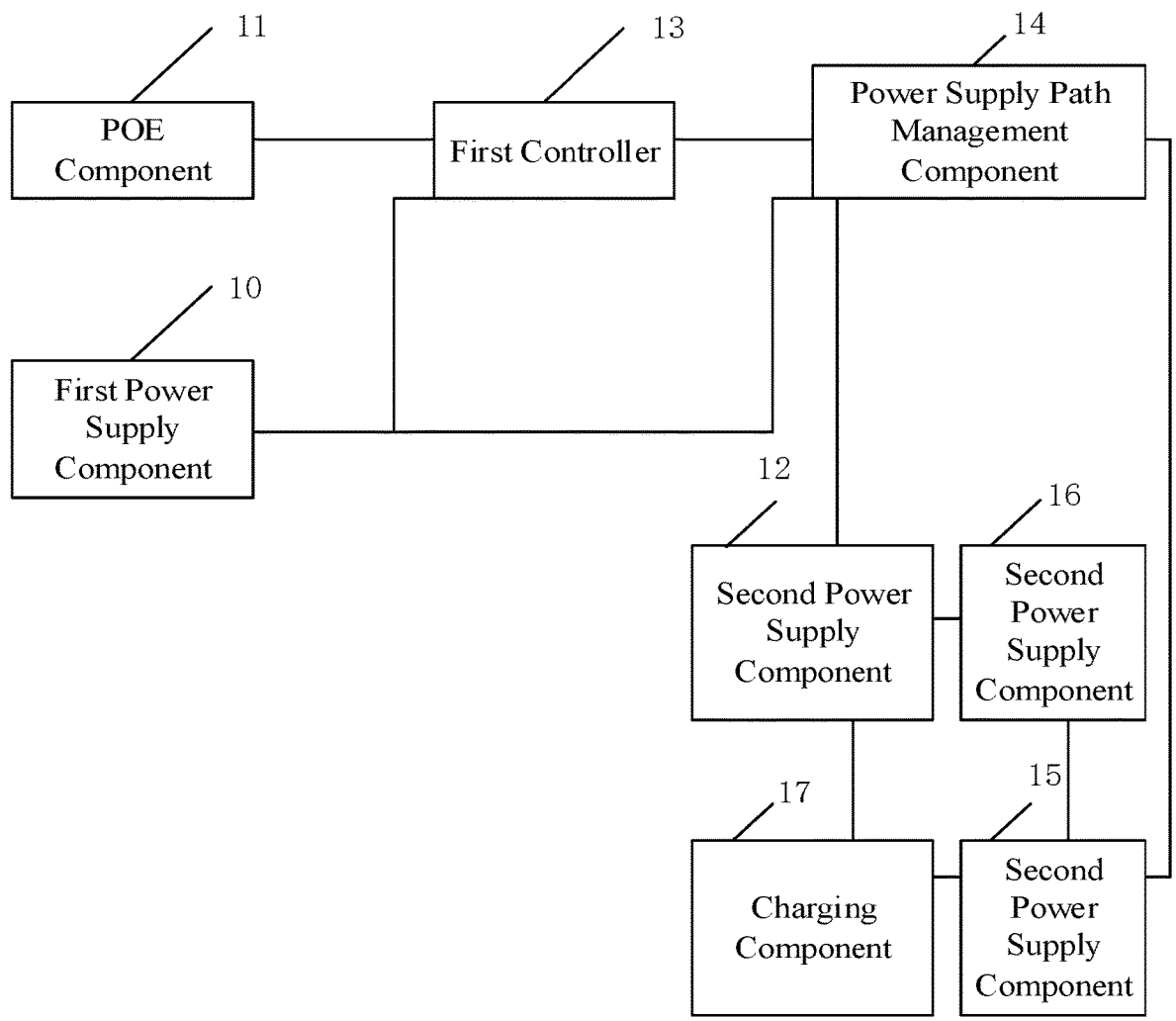
FIG. 3 is a schematic structural diagram of another power supply apparatus according to an embodiment of the present disclosure.

Further alternatively, the second power supply component includes a rechargeable battery. With reference to FIG. 3, the power supply apparatus also includes: a second controller 15, a power query component 16, and a charging component 17. The first controller 13, the first power supply component 10 and the second power supply component 12 are respectively connected to the second controller 15 through the power supply path management component 14. The power query component 16 is respectively connected to the second controller 15 and the second power supply component 12, and the charging component 17 is respectively connected to the second controller 15 and the second power supply component 12.

The second controller may be a chip such as a single-chip microcomputer, Advanced RISC Machines (ARM) or a field programmable gate array (FPGA), and may be determined according to actual design requirements. The second controller and the first controller may be integrated together, or may be arranged separately, which may be selected based on the actual situations.

Specific structures of the charging component and the power query component are not limited here, as long as they can meet corresponding functions. When the charging component is working, power may be supplied by means of the first power supply component or the POE component, which is determined according to actual requirements. It should be noted that a power supply source of the charging component is not drawn in FIG. 3.

The power query component is configured to detect power of the rechargeable battery, and send power information of the rechargeable battery to the second controller.

The second controller is configured to receive the power information of the rechargeable battery, and determine a magnitude relationship between the power of the rechargeable battery and a preset first threshold according to the power information of the rechargeable battery; and open a charging path of the charging component when the power of the rechargeable battery is less than the first threshold. The first threshold may be determined according to actual situations. For example, the first threshold may be 70% of the total power.

It should be noted that the power query component can detect the power of the rechargeable battery in the power supply process of the first power supply component, or detect the power of the rechargeable battery in the power supply process of the POE component, or detect the power of the rechargeable battery in the power supply process of the second power supply component. Of course, the power query component can detect the power of the rechargeable battery in other processes, which is not limited here. In consideration of having no negative effect on the power supply of the second power supply component, any one of the first two modes as mentioned above may be selected.

The second controller may open the charging path of the charging component in the power supply process of the first power supply component, i.e., the rechargeable battery is charged by means of the first power supply component. The second controller may also open the charging path of the charging component in the power supply process of the POE component, i.e., the rechargeable battery is charged by means of the POE component. Whether the rechargeable battery is charged by means of the first power supply component or the POE component may be selected according to the actual situations, which is not limited here.

It is started to charge the rechargeable battery when the power of the rechargeable battery is less than the first threshold, to ensure that the power of the rechargeable battery is always at a saturated level. In this way, it is avoidable that power supply is unavailable due to insufficient power.

To avoid the rechargeable battery from being frequently charged or overcharged, so as to prolong the service life of the rechargeable battery, further alternatively, the second controller is also configured to: receive the power information of the rechargeable battery, and determine the magnitude relationship between the power of the rechargeable battery and a preset second threshold according to the power information of the rechargeable battery; and close the charging path of the charging component when the power of the rechargeable battery is greater than or equal to the second threshold, wherein the second threshold is greater than the first threshold.

The second threshold may be determined based on actual situations. For example, the second threshold may be 100% of the total power.

The present disclosure is described below by taking an example where the power supply apparatus is applied to a ward doorplate.

Figure 4:
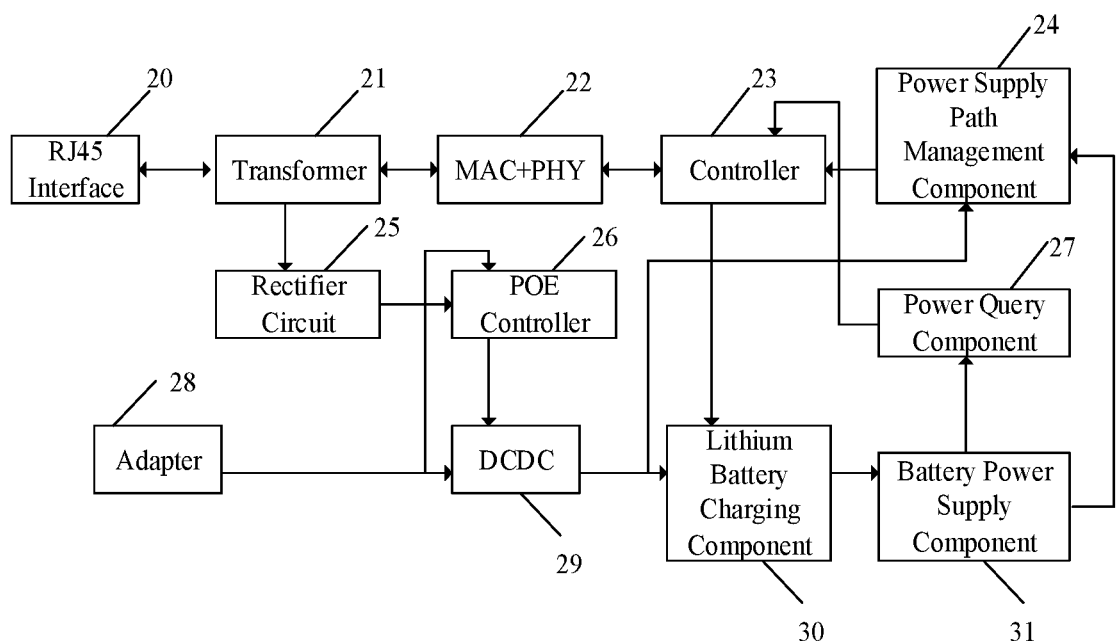
FIG. 4 is a schematic structural diagram of a power supply apparatus of a ward doorplate according to an embodiment of the present disclosure.

With reference to FIG. 4, the power supply apparatus of the ward doorplate includes: an RJ45 interface 20, a transformer 21, an MAC (Media Access Control) and PHY (Physical Layer) chip 22, a controller 23, a rectifier circuit 25, a POE controller 26, a DCDC circuit 29, an adapter 28, a lithium battery charging component 30, a lithium battery power supply component 31, a power query component 27, and a power supply path management component 24. When power is supplied by means of the adapter or the POE controller, after voltage transformation by the DCDC circuit, power is supplied to the entire circuit. When power supply from the adapter and the POE controller is interrupted at the same time, power is supplied to the entire circuit by means of a lithium battery, and power supply switching is controlled by the power supply path management component. The controller can query the remaining power of the lithium battery by means of the power query component, and can control a lithium battery charging circuit whether to charge the lithium battery.

In FIG. 4, network communication between a controller and a power supply terminal may be implemented through a path formed by the RJ45 interface 20, the transformer, the MAC and PHY chip, and the second controller.

The embodiments of the present disclosure provide a method for power supply control, which provides three power supply modes. According to this method for power supply control, when the POE component cannot supply power, power may be supplied by means of the first power supply component or the second power supply component, thereby avoiding losses caused by accidental power outage.

An embodiment of the present disclosure provides an electronic device, which includes the power supply apparatus provided in the foregoing embodiments.

The electronic device may be an apparatus powered by POE, for example, a ward doorplate, an IP telephone, a network camera, and the like. The electronic device has three power supply components, namely, a POE component, a first power supply component, and a second power supply component. When the POE component cannot supply power, the electronic device can still supply power by means of the first power supply component or the second power supply component to ensure normal operation. The electronic device has high reliability and high safety.

Alternatively, the electronic device also includes a wireless communication component. The wireless communication component is connected to the second controller of the power supply apparatus, and is configured to communicate with a server in a communication network under the control of the second controller.

The wireless communication component may be any one of LoRa (Long Range), WiFi (Wireless Fidelity), Bluetooth, Zigbee, and Sub1 GHz, etc. The wireless communication component is mainly configured to communicate with the server through a gateway.

The first power supply component of the power supply apparatus is an adapter power supply component, the second power supply component of the power supply apparatus is a battery power supply component, and the second power supply component includes a rechargeable battery. The rechargeable battery may be a lithium battery.

The power query component of the power supply apparatus is configured to detect power of the rechargeable battery after the power supply path of the second power supply component is opened, and send power information of the rechargeable battery to the second controller.

The second controller is configured to receive the power information of the rechargeable battery, and adjust a heartbeat frequency of the wireless communication component according to the power information of the rechargeable battery.

Here, methods for adjusting the heartbeat frequency of the wireless communication component by the second controller according to the power information of the rechargeable battery is not limited here, and may be determined according to actual situations.

When power is supplied by the rechargeable battery, the heartbeat frequency of the wireless communication component is adjusted according to the power information of the rechargeable battery, to reduce power consumption as much as possible. In this way, power supply duration of the battery can be prolonged.

Alternatively, the second controller being configured to receive the power information of the rechargeable battery, and adjust a heartbeat frequency of the wireless communication component according to the power information of the rechargeable battery includes:

the second controller being configured to:
determine a magnitude relationship between the power of the rechargeable battery and a first predetermined value; and
reduce the heartbeat frequency of the wireless communication component to a first frequency when the power of the rechargeable battery is less than the first predetermined value; reduce the heartbeat frequency of the wireless communication component to a second frequency and reduce a system clock frequency when the power of the rechargeable battery is less than a second predetermined value; and disable a heartbeat function of the wireless communication component when the power of the rechargeable battery is less than a third predetermined value. The first predetermined value is greater than the second predetermined value, the second predetermined value is greater than the third predetermined value, and the first frequency is greater than the second frequency.

Specific numerical values of the first predetermined value, of the second predetermined value and of the third predetermined value may be determined according to actual conditions. For example, the first predetermined value may be 50% of the total power, the second predetermined value may be 30% of the total power, and the third predetermined value may be 10% of the total power.

Specific numerical values of the first frequency and of the second frequency may be determined according to actual conditions. Reducing the heartbeat frequency may be achieved by extending a heartbeat cycle. For example, if the original heartbeat cycle is 500 ms, the heartbeat frequency is 1/500 ms=20 Hz. When the power of the rechargeable battery is less than the first predetermined value, the heartbeat cycle may be increased from 500 ms to 1 s. That is, the heartbeat frequency is reduced from 20 Hz to 1 Hz.

When the power of the rechargeable battery is less than the third predetermined value, the heartbeat function of the wireless communication component is disabled. In this case, a server and gateway query mode may be employed, to ensure normal interaction. In this case, low power prompt information may be reported to the server, and a low power mode is enabled. In the low power mode, the heartbeat mode of the wireless communication component is changed to the server and gateway query mode, the system clock frequency is lower, the display contents are greatly reduced, and only those indispensable display contents are retained. Of course, other measures that can reduce power may also be included, which are not to be enumerated here.

When power is supplied by means of the rechargeable battery, different adjustment measures may be taken according to the power of the rechargeable battery to reduce power consumption as much as possible. In this way, power supply duration of the battery can be extended. This adjustment method is simple and easy for implementation.

Alternatively, the wireless communication component is configured to receive a downlink refresh command and record a plurality of time stamps.

The second controller is also configured to:
analyze system working time according to the plurality of time stamps; and
establish a working model according to an analysis result to adjust a frequency of interaction between the wireless communication component and the server.

The wireless communication component can communicate with the server through the gateway. In this case, frequency of interaction between the wireless communication component and the server is adjusted. That is, frequency of interaction between the wireless communication component and the gateway is adjusted.

Methods for analyzing the system working time and specific contents of the working model are not limited here, which may be determined according to actual situations.

In this way, the frequency of interaction between the wireless communication component and the gateway is dynamically adjusted by means of big data, such that the power consumption is further reduced.

Alternatively, the second controller being also configured to: analyze system working time according to the plurality of time stamps, and establish a working model according to an analysis result to adjust a frequency of interaction between the wireless communication component and the server includes:

the second controller being further configured to:
divide the system working time into a first working time period and a second working time period according to the plurality of time stamps.

The frequency of interaction between the wireless communication component and the server in the first working time period is greater than that in the second working time period.

The first working time period may be a time period of normal work during a day, for example: 8:00-18:00. The second working time period may be a time period other than the first working time period, for example: 20:00-6:00. Of course, the specific time periods in practice need to be analyzed and determined based on a large number of time stamps.

The frequency of interaction between the wireless communication component and the server during the first working time period may be the same frequency of interaction during the entire first working time period. The first working time period may also be subdivided into a plurality of time periods, and different frequencies of interaction may be set for each of the plurality of time periods, wherein specific setting methods need to be determined according to actual situations. For example, if the first working time period is 8:00-18:00, the frequency of interaction in the time period 9:00-11:00 may be greater than that in the time period 12:00-13:30. Of course, other setting methods may also be available, which may be set according to actual analysis results.

Similarly, the frequency of interaction between the wireless communication component and the server during the second working time period may be the same frequency of interaction during the entire second working time period. The second working time period may also be subdivided into a plurality of time periods, and different frequencies of interaction may be set for each of the plurality of time periods, wherein specific setting methods need to be determined according to actual situations. For example, if the second working time period is 20:00-6:00, the frequency of interaction in the time period 20:00-2:00 may be greater than that in the time period 5:00-6:00. Of course, other setting methods may also be available, which may be set according to actual analysis results.

In the first working time period, the downlink refresh commands are frequent, the frequency of interaction is higher, and the cycle of interaction is shorter. In the second working time period, the downlink refresh commands are fewer, the frequency of interaction is lower, and the cycle of interaction is longer. According to the above analysis results, the following working model may be established. The frequency of interaction between the wireless communication component and the server during the first working time period is greater than the frequency of interaction during the second working time period. In the first working time period, the frequency of interaction between the wireless communication component and the server is higher, i.e., the cycle of interaction between the wireless communication component and the server is shortened. In the second working time period, the frequency of interaction between the wireless communication component and the server is lower, i.e., the cycle of interaction between the wireless communication component and the server is extended. In this way, the system working time may be analyzed based on a large number of time stamps, and a working model may be established, such that different frequencies of interaction may be adopted according to different time periods, thereby further reducing the power consumption. This method is simple and easy for implementation.

To facilitate the user to view, in real time, information received by the wireless communication component, alternatively, the electronic device may further include a display screen. The display screen is connected to the second controller and is configured to display the information received by the wireless communication component.

Types of the display screen are not limited. As an example, the display screen may be any one of an electronic ink screen, a liquid crystal display screen, and an organic light-emitting diode (OLED) display screen. If the above electronic device is a ward doorplate, information displayed on the display screen may include personal information about a patient, and information about an attending doctor and a ward, etc.

Figure 5:
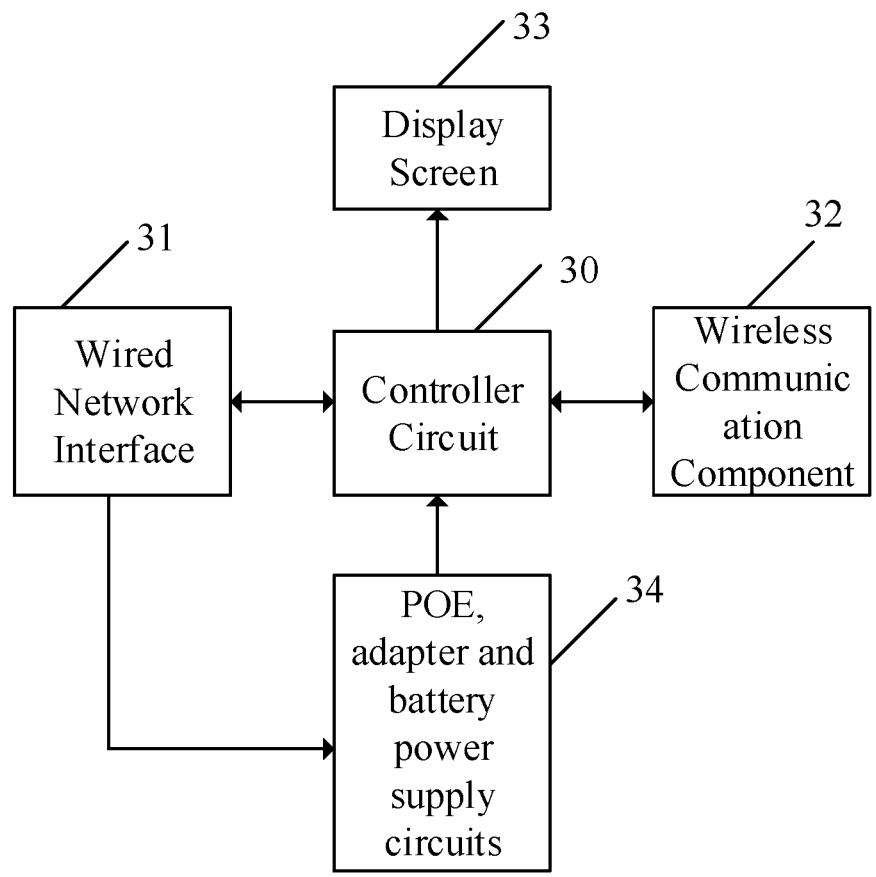
FIG. 5 is a schematic structural diagram of a ward doorplate according to an embodiment of the present disclosure.

A system structure block diagram of the ward doorplate may be as shown in FIG. 5. The ward doorplate includes a controller circuit 30, a wired network interface 31 (for example: RJ45 interface), a power supply circuit 34 (including a POE power supply circuit, an adapter power supply circuit and a battery power supply circuit), a wireless communication component 32, and a display screen 33. The controller circuit includes a microcontroller unit (MCU) and an external circuit thereof. The controller is configured to execute the entire logic control and calculation. The wireless communication component may be any of LoRa, WiFi, Bluetooth, Zigbee, and Sub1 GHz, and is configured to communicate with the gateway. The display screen may be an electronic ink screen, and the controller is configured to control the update of the display contents of the electronic ink screen.

A working process is as follows. The controller of the ward doorplate receives, through the wireless communication component, refreshed data sent from the server through the gateway. Next, the controller saves the data in a memory, and drives the display screen, through a display screen drive circuit, to display the corresponding contents.

Figure 9:
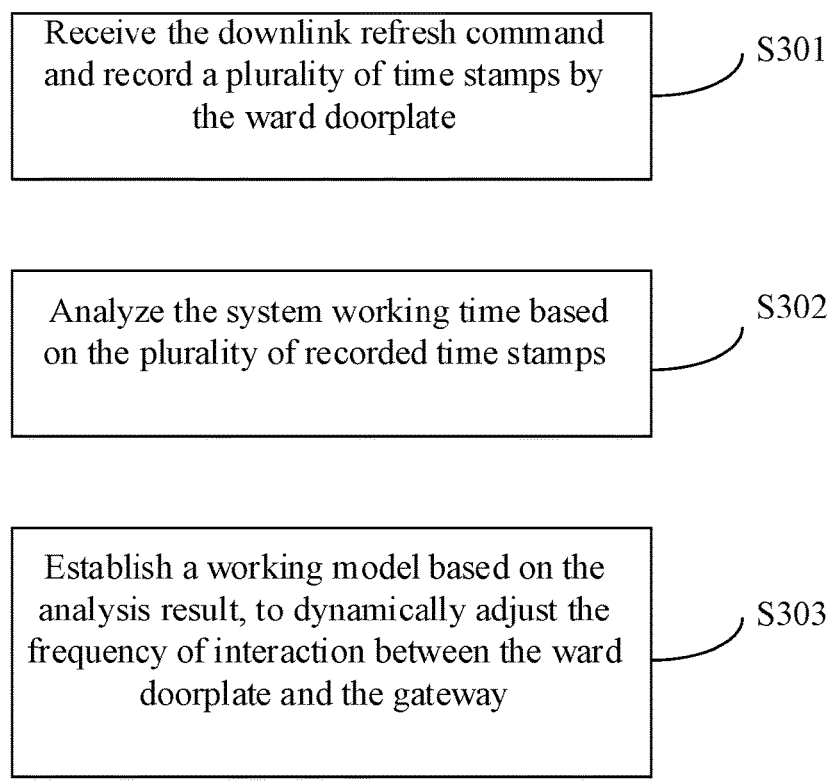
FIG. 9 is a schematic flow diagram of a method for adjusting a frequency of interaction between a ward doorplate and a gateway according to an embodiment of the present disclosure.

After the ward doorplate is arranged successfully, a method for adjusting the frequency of interaction between the ward doorplate and the gateway is as shown in FIG. 9, and the method includes following steps.

Step S301: receiving the downlink refresh command and recording the plurality of time stamps by the ward doorplate.

Step S302: analyzing the system working time based on the plurality of recorded time stamps.

Step S303: establishing a working model based on the analysis result, to dynamically adjust the frequency of interaction between the ward doorplate and the gateway.

That is, when receiving the downlink refresh command, the ward doorplate may record the current time stamp, analyze the system working time based on the plurality of recorded time stamps, and establish the working model. When the ward doorplate is working in the first working time period with a high refresh rate, the cycle of interaction between the ward doorplate and the gateway may be shortened, to improve a real-time refresh rate. When the ward doorplate is working in the second working time period with a low refresh rate, the cycle of interaction between the ward doorplate and the gateway may be extended, to achieve lower power consumption. The frequency of interaction between the ward doorplate and the gateway is dynamically adjusted by means of big data.

Figure 6:
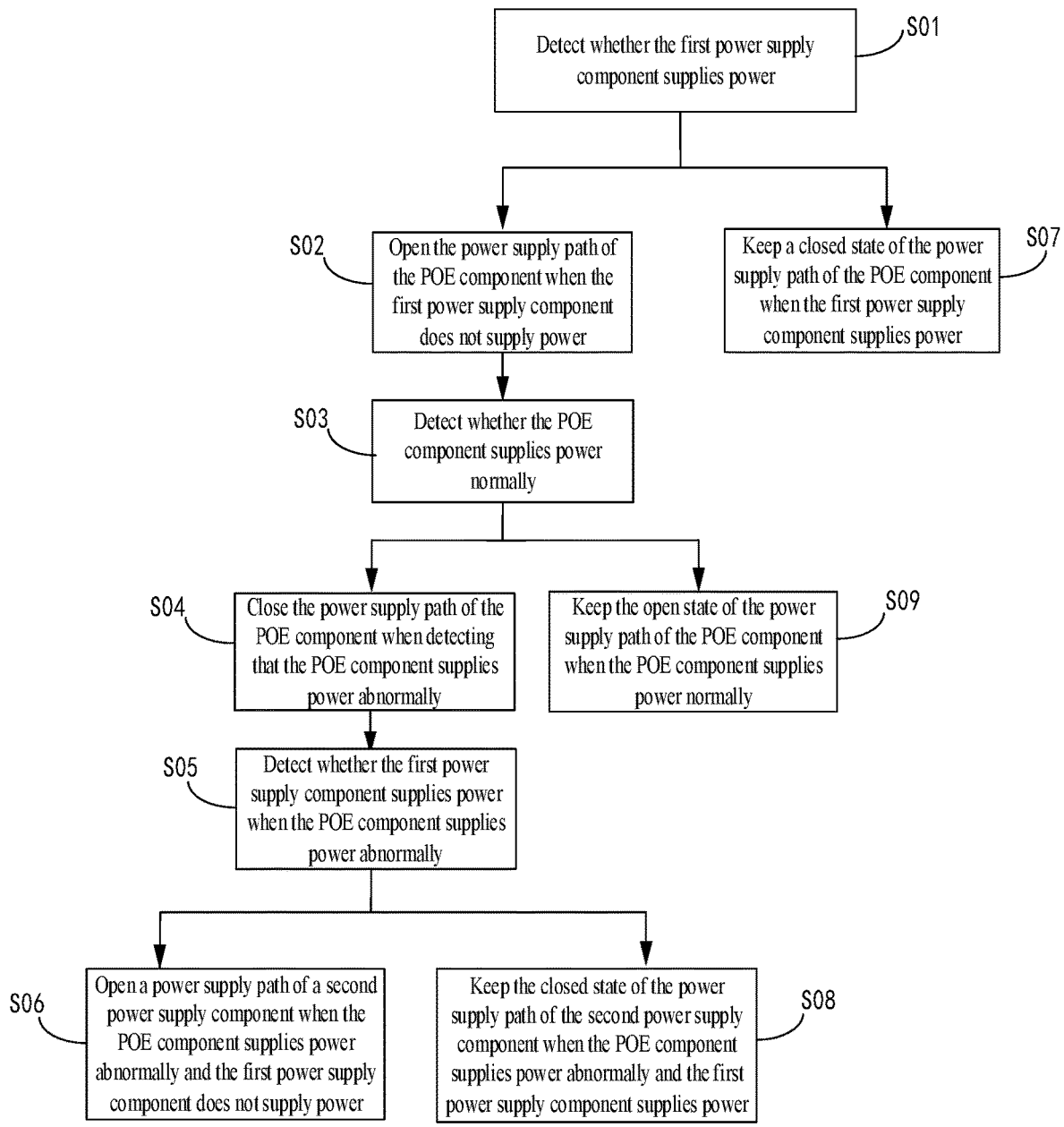
FIG. 6 is a schematic flow diagram of a method for power supply control according to an embodiment of the present disclosure.

An embodiment of the present disclosure provides a method for power supply control, which is applied to the electronic device provided in Embodiment II. With reference to FIG. 6, this method includes following steps.

Step S01: detecting whether the first power supply component supplies power.

Step S02: opening the power supply path of the POE component when the first power supply component does not supply power.

Step S03: detecting whether the POE component supplies power normally.

Step S04: closing the power supply path of the POE component when detecting that the POE component supplies power abnormally.

Step S05: detecting whether the first power supply component supplies power when the POE component supplies power abnormally.

Step S06: opening a power supply path of a second power supply component when the POE component supplies power abnormally and the first power supply component does not supply power.

An embodiment of the present disclosure provides a method for power supply control, which provides three power supply modes. According to this method for power supply control, when the POE component cannot supply power, power may be supplied by means of the first power supply component or the second power supply component, thereby avoiding losses caused by accidental power outage.

To prevent the first power supply component and the POE component from supplying power synchronously, so as to avoid waste of resources and high costs, alternatively, referring to FIG. 6, after the Step S01 of detecting whether the first power supply component supplies power, the method further includes:

Step S07: keeping a closed state of the power supply path of the POE component when the first power supply component supplies power.

To prevent the first power supply component and the second power supply component from supplying power synchronously when the POE component supplies power abnormally, so as to avoid waste of resources and high costs, alternatively, referring to FIG. 6, after the Step S05 of detecting whether the first power supply component supplies power when the POE component supplies power abnormally, the method further includes:

Step S08: keeping the closed state of the power supply path of the second power supply component when the POE component supplies power abnormally and the first power supply component supplies power.

Alternatively, to ensure the continuous and normal operation of the POE component, referring to FIG. 6, after the Step S03 of detecting whether the POE component supplies power normally, the method further includes:

Step S09: keeping the open state of the power supply path of the POE component when the POE component supplies power normally.

Alternatively, the power supply apparatus of the electronic device includes a charging component. The first power supply component is an adapter power supply component, the second power supply component is a battery power supply component, and the second power supply component includes a rechargeable battery.

Figure 7:
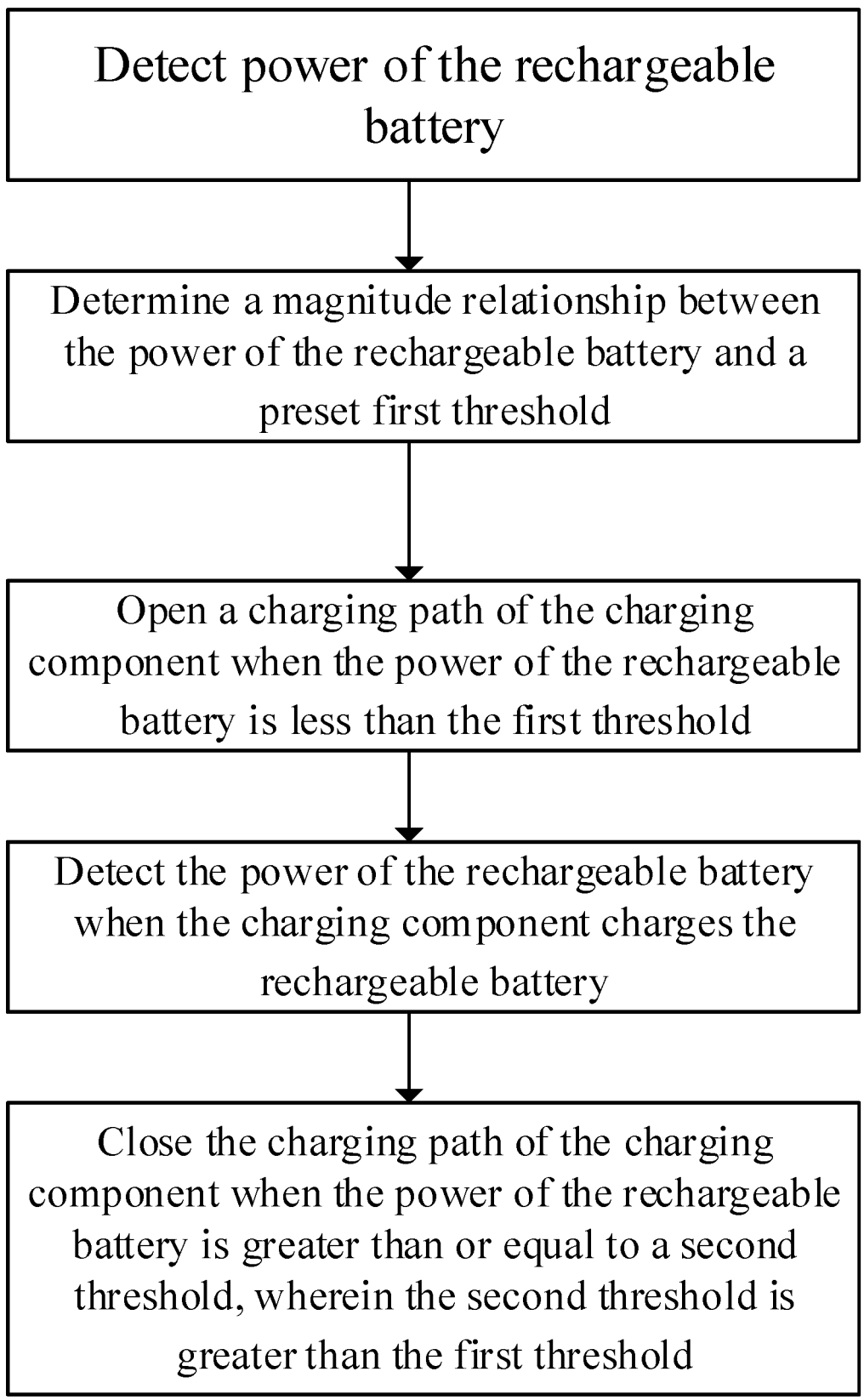
FIG. 7 is a schematic flow diagram of another method for power supply control according to an embodiment of the present disclosure.

With reference to FIG. 7, this method also includes following steps.

Step S101: detecting power of the rechargeable battery.

Step S102: determining a magnitude relationship between the power of the rechargeable battery and a preset first threshold.

Step S103: opening a charging path of the charging component when the power of the rechargeable battery is less than the first threshold.

In the Step S101, the power of the rechargeable battery may be detected in the power supply process of the first power supply component, or the power of the rechargeable battery may be detected in the power supply process of the POE component, or the power of the rechargeable battery may be detected in the power supply process of the second power supply component. Of course, the power of the rechargeable battery also may be detected in other processes, which is not limited here. In consideration of having no negative effect on the power supply of the second power supply component, any one of the first two modes as mentioned above may be selected.

In the Step S103, the first threshold may be determined according to actual situations. For example, the first threshold may be 70% of the total power.

In the Step S103, the charging path of the charging component may be opened in the power supply process of the first power supply component when the power of the rechargeable battery is less than the first threshold, i.e., the rechargeable battery is charged by means of the first power supply component. The charging path of the charging component may be opened in the power supply process of the POE component, i.e., the rechargeable battery is charged by means of the POE component. Whether the rechargeable battery is charged by means of the first power supply component or the POE component may be selected according to the actual situations, which is not limited here.

It is started to charge the rechargeable battery when the power of the rechargeable battery is less than the first threshold, to ensure that the power of the rechargeable battery is always at a saturated level. In this way, it is avoidable that power supply is unavailable due to insufficient power.

To avoid the rechargeable battery from being frequently charged or overcharged, so as to prolong the service life of the rechargeable battery, further alternatively, with reference to FIG. 7, this method also includes following steps.

Step S104: detecting the power of the rechargeable battery when the charging component charges the rechargeable battery.

Step S105: closing the charging path of the charging component when the power of the rechargeable battery is greater than or equal to a second threshold, wherein the second threshold is greater than the first threshold.

After the power supply path of the second power supply component is opened, to further reduce the power consumption of the electronic device so as to prolong the service life of the second power supply component, the following two methods for power supply control may be further employed.

According to the first method for power supply control, the electronic device also includes a wireless communication component. The wireless communication component is connected to the second controller of the power supply apparatus, and the wireless communication component is configured to communicate with a server in a communication network under the control of the second controller.

Figure 8:
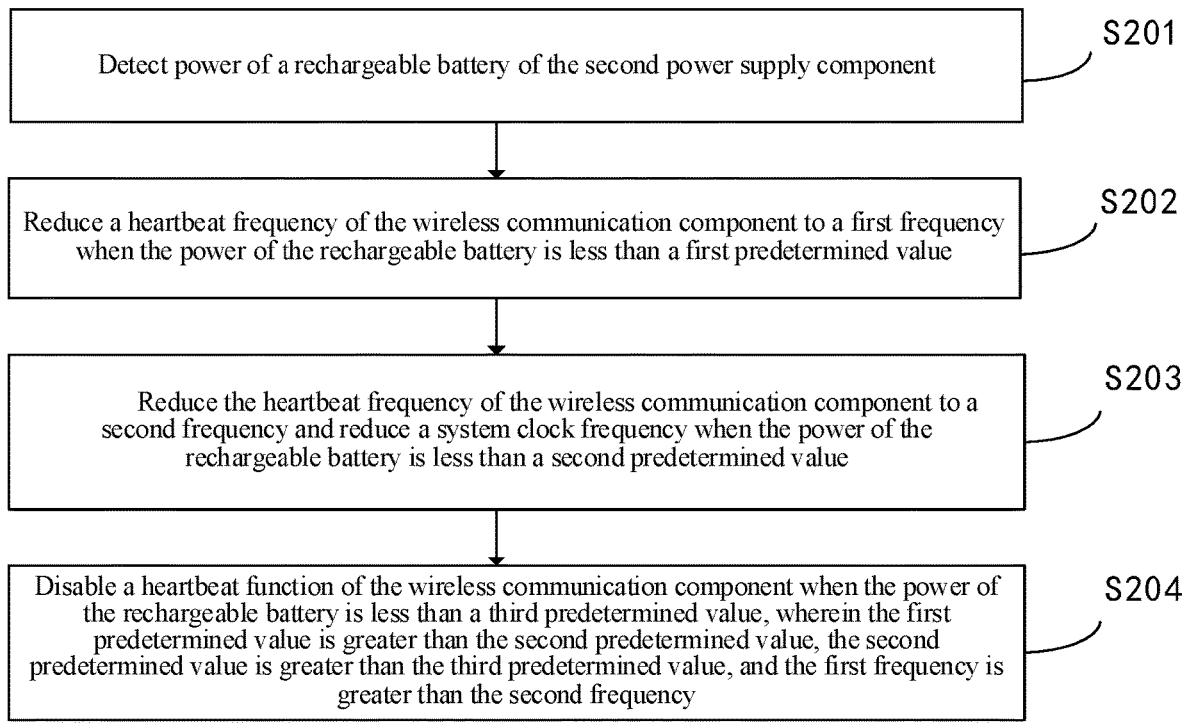
FIG. 8 is a schematic flow diagram of still another method for power supply control according to an embodiment of the present disclosure.

After the power supply path of the second power supply component is opened, with reference to FIG. 8, the method for power supply control also includes the following steps.

Step S201: detecting power of a rechargeable battery of the second power supply component.

Step S202: reducing a heartbeat frequency of the wireless communication component to a first frequency when the power of the rechargeable battery is less than a first predetermined value.

Step S203: reducing the heartbeat frequency of the wireless communication component to a second frequency and reducing a system clock frequency when the power of the rechargeable battery is less than a second predetermined value.

Step S204: disabling a heartbeat function of the wireless communication component when the power of the rechargeable battery is less than a third predetermined value. The first predetermined value is greater than the second predetermined value, the second predetermined value is greater than the third predetermined value, and the first frequency is greater than the second frequency.

According to the second method for power supply control, the electronic device also includes a wireless communication component. The wireless communication component is connected to the second controller of the power supply apparatus, and is configured to receive a downlink refresh command under the control of the second controller, and to record a plurality of time stamps. The second controller is configured to divide system working time into a first working time period and a second working time period according to the plurality of time stamps.

After the power supply path of the second power supply component is opened, the method for power supply control also includes following steps.

Step S301: enabling a first power mode in the first working time period.

In the first working time period, frequency of interaction between the wireless communication component and the server is higher, and cycle of interaction between the wireless communication component and the server is shorter. In this case, it is required to keep the device running in a first power mode. In the first power mode (i.e., a high power mode), the heartbeat frequency of the wireless communication component is higher, the system clock frequency is higher, the display content is detailed, and the power consumption in the first power mode is much higher than the power consumption in a second power mode.

Step S302: enabling the second power mode in the second working time period, wherein the power consumption in the second power mode is less than that in the first power mode.

In the second working time period, frequency of interaction between the wireless communication component and the server is lower, and cycle of interaction between the wireless communication component and the server is longer. In this case, the device can be kept running in the second power mode. In the second power mode (i.e., a low power mode), the heartbeat function of the wireless communication component is disabled, and it is changed to a server and gateway query mode, and the system clock frequency is lower. Furthermore, the display contents are greatly reduced, and only those indispensable display contents are retained. The power consumption in the second power mode is much lower than the power consumption in the first power mode. Of course, other measures that can reduce power may also be included, which are not to be enumerated here.

It is to be noted that the above two methods may be employed synchronously or separately, which may be determined according to actual situations. However, when the above two methods are employed synchronously, some conflicts may occur. For example: if the power of the rechargeable battery is less than the third predetermined value, according to the first method, the second power mode should be enabled. However, if it is in the first working time period at this moment, according to the second method, the first power mode should be enabled. In this case, a priority may be set in advance. For example, an example is taken where the power of the rechargeable battery is less than the third predetermined value and it is in the first working time period, a higher priority may be set for the second method. That is, the first power mode is enabled according to the second method. Of course, the second power mode is enabled if a higher priority is set for the first method. To improve user experience, a higher priority may be set for the second method. To prolong service life of the device, a higher priority may be set for the first method.

It is to be noted that, reference may be made to Embodiment I and Embodiment II for contents of structural portions involved in the above method, and thus their detailed descriptions are omitted herein.

"One embodiment", "embodiments" or "one or more embodiments" herein means that particular features, structures or characteristics described in combination with the embodiments are included in at least one embodiment of the present disclosure. Furthermore, it is to be noted that the term "in one embodiment" herein does not necessarily refers to the same embodiment.

Many details are discussed in the specification provided herein. However, it should be understood that the embodiments of the present disclosure can be practiced without these specific details. In some examples, the well-known methods, structures and technologies are not shown in detail so as to avoid an unclear understanding of the description.

In the claims, no reference mark between round brackets shall impose restriction on the claims. The word "comprise" does not exclude a component or step not listed in the claims. The wording "a" or "one" in front of a component does not exclude the presence of a plurality of such components. The present disclosure may be realized by way of hardware comprising a number of different components and by way of a suitably programmed computer. In the unit claim listing a plurality of devices, some of these devices may be embodied in the same hardware. The wordings "first", "second", and "third", etc. do not denote any order. These wordings can be construed as naming.

The above is merely specific embodiments of the present disclosure, but the protection scope of the present disclosure is not limited thereto. Any variation or substitution easily conceivable to those skilled in the art shall fall into the protection scope of the present disclosure. Therefore, the protection scope of the present disclosure shall be subject to the protection scope of the claims.

The invention claimed is:

1. An electronic device, comprising a power supply apparatus, wherein power supply apparatus comprises a first power supply component, a power over Ethernet (POE) component, a second power supply component, a first controller, and a power supply path management component;
    the power supply path management component is configured to open or close a power supply path of a power supply component connected to the power supply path management component, to implement power supply switching between different power supply components;
    the POE component is connected to the first controller;
    the first controller and the second power supply component are respectively connected to the power supply path management component; and
    the first controller is configured to:
    detect whether the first power supply component supplies power;
    close the power supply path of the POE component when the first power supply component supplies power normally; and
    control the power supply path management component to open the power supply path of the second power supply component when the POE component supplies power abnormally and the first power supply component does not supply power; and
    the electronic device further comprises a wireless communication component, wherein the wireless communication component is one of Long Range, Wireless Fidelity, Bluetooth, Zigbee, and Sub1 GHz, is connected to the second controller of the power supply apparatus, and is configured to communicate with a server in a communication network under control of the second controller;
    the first power supply component of the power supply apparatus is an adapter power supply component comprising an adapter and a power cord and power supply is capable of being implemented by plugging the adapter into a socket, and the second power supply component of the power supply apparatus is a battery power supply component; and the second power supply component comprises a rechargeable battery;
    a power query component of the power supply apparatus is configured to detect power of the rechargeable battery after the power supply path of the second power supply component is opened, and send power information of the rechargeable battery to the second controller; and
    the second controller is configured to receive the power information of the rechargeable battery, and adjust a heartbeat frequency of the wireless communication component according to the power information of the rechargeable battery.

2. The electronic device according to claim 1, wherein the second controller being configured to receive the power information of the rechargeable battery, and adjust a heartbeat frequency of the wireless communication component according to the power information of the rechargeable battery, comprises:
the second controller being configured to:
determine a magnitude relationship between the power of the rechargeable battery and a first predetermined value;
reduce the heartbeat frequency of the wireless communication component to a first frequency when the power of the rechargeable battery is less than the first predetermined value;
reduce the heartbeat frequency of the wireless communication component to a second frequency and reduce a system clock frequency when the power of the rechargeable battery is less than a second predetermined value; and
disable a heartbeat function of the wireless communication component when the power of the rechargeable battery is less than a third predetermined value;
wherein the first predetermined value is greater than the second predetermined value, and the second predetermined value is greater than the third predetermined value, and the first frequency is greater than the second frequency.

3. The electronic device according to claim 2, wherein the wireless communication component is configured to receive a downlink refresh command and record a plurality of time stamps; and
the second controller is further configured to:
analyze system working time according to the plurality of time stamps; and
establish a working model according to an analysis result to adjust a frequency of interaction between the wireless communication component and the server.

4. The electronic device according to claim 2, wherein
the second controller being further configured to: analyze system working time according to the plurality of time stamps; and establish a working model according to an analysis result to adjust a frequency of interaction between the wireless communication component and the server, comprises:
the second controller being further configured to:
divide the system working time into a first working time period and a second working time period according to the plurality of time stamps; wherein
the frequency of interaction between the wireless communication component and the server in the first working time period is greater than that in the second working time period.

5. The electronic device according to claim 1, further comprising a display screen, wherein the display screen is connected to the second controller, and is configured to display information received by the wireless communication component.

6. The electronic device according to claim 1, wherein the first power supply component is respectively connected to the first controller and the power supply path management component.

7. The electronic device according to claim 1, wherein the first controller is further configured to:
open the power supply path of the POE component when the first power supply component does not supply power;
detect whether the POE component supplies power normally; and
control the power supply path management component to keep a closed state of the power supply path of the second power supply component when the POE component supplies power abnormally and the first power supply component supplies power.

8. The electronic device according to claim 1, wherein the power supply apparatus further comprises a charging component;
the first controller, the first power supply component and the second power supply component are respectively connected to the second controller through the power supply path management component, the power query component is respectively connected to the second controller and the second power supply component, and the charging component is respectively connected to the second controller and the second power supply component;
the power query component is configured to detect power of the rechargeable battery, and send power information of the rechargeable battery to the second controller; and
the second controller is configured to:
receive the power information of the rechargeable battery, and determine a magnitude relationship between the power of the rechargeable battery and a preset first threshold according to the power information of the rechargeable battery; and open a charging path of the charging component when the power of the rechargeable battery is less than the first threshold.

9. The electronic device according to claim 8, wherein the second controller is further configured to:
receive the power information of the rechargeable battery, and determine the magnitude relationship between the power of the rechargeable battery and a preset second threshold according to the power information of the rechargeable battery; and close the charging path of the charging component when the power of the rechargeable battery is greater than or equal to the second threshold, wherein the second threshold is greater than the first threshold.

10. A method for power supply control, applied to an electronic device including a power supply apparatus, wherein the power supply apparatus includes a first power supply component, a power over Ethernet (POE) component, a second power supply component, a first controller, and a power supply path management component;
the first power supply component is an adapter power supply component including an adapter and a power cord and power supply is capable of being implemented by plugging the adapter into a socket;
the second power supply component is a battery power supply component, and the second power supply component includes a rechargeable battery;
the power supply path management component is configured to open or close a power supply path of a power supply component connected to the power supply path management component, to implement power supply switching between different power supply components;
the POE component is connected to the first controller;
the first controller and the second power supply component are respectively connected to the power supply path management component; and
the first controller is configured to:
detect whether the first power supply component supplies power;
close the power supply path of the POE component when the first power supply component supplies power normally; and
control the power supply path management component to open the power supply path of the second power supply component when the POE component supplies power abnormally and the first power supply component does not supply power; and the electronic device further includes a wireless communication component, wherein the wireless communication component is one of Long Range, Wireless Fidelity, Bluetooth, Zigbee, and Sub1GHz, is connected to the second controller of the power supply apparatus, and is configured to communicate with a server in a communication network under control of the second controller; and the method for power supply control comprises:

detecting whether the first power supply component supplies power;

opening the power supply path of the POE component when detecting that the first power supply component does not supply power;

detecting whether the POE component supplies power normally;

closing the power supply path of the POE component when detecting that the POE component supplies power abnormally;

detecting whether the first power supply component supplies power when the POE component supplies power abnormally; and opening the power supply path of a second power supply component when the POE component supplies power abnormally and the first power supply component does not supply power; and after opening the power supply path of the second power supply component, the method for power supply control further comprises:

detecting power of the rechargeable battery of the second power supply component;

reducing a heartbeat frequency of the wireless communication component to a first frequency when the power of the rechargeable battery is less than a first predetermined value;

reducing the heartbeat frequency of the wireless communication component to a second frequency and reducing a system clock frequency when the power of the rechargeable battery is less than a second predetermined value; and disabling a heartbeat function of the wireless communication component when the power of the rechargeable battery is less than a third predetermined value;

wherein the first predetermined value is greater than the second predetermined value, and the second predetermined value is greater than the third predetermined value, and the first frequency is greater than the second frequency.

11. The method for power supply control according to claim 10, wherein the power supply apparatus of the electronic device includes a charging component;

wherein the method for power supply control further comprises:

detecting power of the rechargeable battery;

determining a magnitude relationship between the power of the rechargeable battery and a preset first threshold; and opening a charging path of the charging component when the power of the rechargeable battery is less than the first threshold.

12. The method for power supply control according to claim 11, further comprising:

detecting the power of the rechargeable battery when the charging component charges the rechargeable battery;

closing the charging path of the charging component when the power of the rechargeable battery is greater than or equal to a second threshold;

wherein the second threshold is greater than the first threshold.

13. The method for power supply control according to claim 10, wherein the wireless communication component is connected to the second controller of the power supply apparatus, and is configured to receive a downlink refresh command under control of the second controller, and to record a plurality of time stamps;

the second controller is configured to divide system working time into a first working time period and a second working time period according to the plurality of time stamps; and after opening the power supply path of the second power supply component, the method for power supply control further comprises:

enabling a first power mode in the first working time period; and enabling a second power mode in the second working time period, wherein power consumption in the second power mode is less than that in the first power mode.

* * * * *